United States Patent [19]
Montz

[11] Patent Number: 6,155,771
[45] Date of Patent: Dec. 5, 2000

[54] GAME HOIST WITH ROTATING BOOM

[76] Inventor: Andre' J. Montz, 145 Za Rd., Reserve, La. 70084

[21] Appl. No.: 09/334,164
[22] Filed: Jun. 16, 1999
[51] Int. Cl.[7] .............................. B60P 1/54; B66C 23/44
[52] U.S. Cl. ........................ 414/543; 414/462; 414/540; 414/546; 414/555; 212/180
[58] Field of Search .................... 414/462, 540, 414/541, 542, 543, 546, 547, 550, 555, 560, 569; 212/180, 901

[56] References Cited

U.S. PATENT DOCUMENTS

| | | | |
|---|---|---|---|
| 500,328 | 6/1893 | Hays | 414/543 |
| 3,804,263 | 4/1974 | Castonguay | 212/180 |
| 3,831,712 | 8/1974 | Neely et al. | 414/609 |
| 3,952,893 | 4/1976 | Kolesar | 414/462 |
| 4,419,038 | 12/1983 | Pendergraft | 414/543 |
| 4,614,252 | 9/1986 | Tarner | 182/116 |
| 4,640,658 | 2/1987 | Webb | 414/462 |
| 4,806,063 | 2/1989 | York | 414/462 |
| 4,979,865 | 12/1990 | Strickland | 414/486 |
| 5,236,062 | 8/1993 | Laney | 182/127 |
| 5,395,284 | 3/1995 | Frisk | 452/187 |
| 5,419,672 | 5/1995 | Poe | 414/540 |
| 5,445,487 | 8/1995 | Koscinski | 414/543 |
| 5,531,478 | 7/1996 | Houston et al. | 280/762 |
| 5,562,534 | 10/1996 | Mc Gough | 452/187 |
| 5,588,907 | 12/1996 | De Pietro | 452/187 |
| 5,662,451 | 9/1997 | Muzzi | 414/540 |
| 5,788,095 | 8/1998 | Watson | 212/180 |
| 5,975,831 | 11/1999 | Martin | 414/543 |

Primary Examiner—Robert P. Olszewski
Assistant Examiner—Gerald J. O'Connor
Attorney, Agent, or Firm—Garvey, Smith, Nehrbass & Doody, L.L.C.

[57] ABSTRACT

A load-bearing hoist (10) to lift and load game or other objects. The hoist (10) is particularly adapted for attachment to an ATV. The hoist (10) includes a 360 degree rotating horizontal boom (11) attached to a two-piece telescoping vertical shaft (28). The two-piece telescoping vertical shaft (28) allows the height of the boom (11) to be varied. The hoist (10) is attached to the ATV by a base plate (31) and support sleeve (13) which allows the hoist (10) to be supported in a vertical position and removes any weight load from the ATV. The base (16) of the hoist (10) can be used to carry a hunter's tree climber stand or gun case.

20 Claims, 8 Drawing Sheets

GAME HOIST WITH ROTATING BOOM

CROSS REFERENCE TO RELATED APPLICATIONS

Not Applicable

STATEMENT REGARDING FEDERALLY SPONSORED RESEARCH & DEVELOPMENT

N/A

BACKGROUND OF THE INVENTION

1. Field of Invention

The present invention is a load-bearing hoist with a 360 degree rotating boom to lift and load game or other objects onto the back of an all terrain vehicle (ATV).

2. Description of the Prior Art

In recent years the all terrain vehicle (ATV) has become a very popular means of transportation by hunters and other outdoor enthusiasts. Cargo racks provided on an ATV can be used to transport objects. However, heavy objects i.e. game, sacks of feed, fertilizer, etc. could require assistance to lift and load onto the cargo rack of an ATV.

In prior art, hoists have been proposed to aid in field dressing i.e. gutting game. The hoists in prior art, however, were not easily mounted nor easily removed from an ATV. Further, hoists in prior art were not sole load bearing support and did not provide a 360 degree rotating boom.

The hoist of the present invention, in combination with the widely available ATV, can bring about the realization of a game hoist that can be used by a single person to lift and load heavy objects onto the cargo rack of an ATV. In addition, the hoist of the present invention provides a rack to carry a hunter's tree climber stand or gun case.

U.S. Pat. No. 3,804,263, issued to Roger Castonguay on Apr. 16, 1974, shows a portable hoist mounted in the open trunk of an automobile. Castonguay does not show a base for attachment to an ATV, having two shaft sections that are fixed relative to a support plate with the two shaft sections being perpendicular to one another.

U.S. Pat. No. 3,952,893, issued to Joseph J. Kolesar on Apr. 27, 1976, shows a light weight hoist mounted to the bumper of an automobile. Kolesar does not shows a base for attachment to an ATV. having two shaft sections that are fixed relative to a support plate with the two shaft sections being perpendicular to one another.

U.S. Pat. No. 4,419,038, issued to Billy D. Pendergraft on Dec. 6, 1983, shows a folding hoist mounted below the tailgate of a pickup truck. Pendergraft does not show a base for attachment to an ATV, having two shaft sections that are fixed relative to a support plate with the two shaft sections being perpendicular to one another.

U.S. Pat. No. 4,806,063, issued to W. Clifton York on Feb. 21, 1989, shows a portable wild game hoist that can be mounted to the bumper and fender of a four wheel drive passenger vehicle. York does not show a base for attachment to an ATV, having two shaft sections that are fixed relative to a support plate with the two shaft sections being perpendicular to one another.

U.S. Pat. No. 4,979,865, issued to Jerome R. Strickland on Dec. 25, 1990, shows a hoist mounted to the bed of a pickup truck. Strickland does not show a base for attachment to an ATV, having two shaft sections that are fixed relative to a support plate with the two shaft sections being perpendicular to one another.

U.S. Pat. No. 5,395,284, issued to Mark D. Frisk on Mar. 7, 1995, shows a hoist for big game designed to be hooked to a tree. Frisk does not show a base for attachment to an ATV, having two shaft sections that are fixed relative to a support plate wit the two shaft sections being perpendicular to one another.

U.S. Pat. No. 5,419,672, issued to Jimmy Poe on May 30, 1995, shows a hoist mounted to the tailgate of a pickup truck. Poe does not show a base for attachment to an ATV, having two shaft sections that are fixed relative to a support plate with the two shaft sections being perpendicular to one another.

U.S. Pat. No. 5,445,487, issued to Stanley Koscinski, Jr. on Aug. 29, 1995, shows a hoist with a telescoping boom that can be mounted to a variety of support structures. Kosinski. Jr. does not show a base for an attachment to an ATV, having two shaft sections that are fixed relative to a support plate with the two shaft sections being perpendicular to one another.

U.S. Pat. No. 5,562,534, issued to Alvin H. McGough on Oct. 8, 1996, shows a portable hoist and skinning aid that can be mounted to a tree, post or other vertical object. It does not show a base for an ATV.

U.S. Pat. No 5,588,907, issued to Richard P. DePietro and Brian J. Wilkinson on Dec. 31, 1996, shows a portable hoist for hanging game or other objects from an existing support structure. DePietro and Wilkinson do not show a base for an attachment to an ATV. Also, they do not show a rotating boom used to mount game or other objects onto an ATV.

U.S. Pat. No. 5,662,451, issued to Vincent Muzzi, Shaw and Joe Muzzi, Jr. on Sep. 2, 1997, shows a hoist to raise and/or hang game animals mounted onto an all terrain vehicle. It does not show a rotating boom used to mount game or other objects onto an all terrain vehicle. The shaft in this art is in a fixed position. Further, the weight of the game is placed on the ATV and the attachable bracing legs.

None of the above inventions and patents, taken either singly or in combination, is seen to describe the instant invention as claimed.

SUMMARY OF THE INVENTION

The present invention is directed to a load-bearing hoist for lifting and loading game animals or other objects onto the back of an all terrain vehicle (ATV). The hoist is a two-piece telescoping vertical support shaft with an upper portion that telescopes within a lower portion thus allowing the height of the hoist to be varied. A 360 degree rotating horizontal boom is fixed to the top of the upper portion of the vertical shaft. A manually operated winch is attached to the horizontal boom. A supply of nylon rope is wound around the spool of the winch. At the free end of the nylon rope a hook is provided. The hoist is supported by a sleeve that is mounted to the back of an ATV rack. A pin is removed to allow the bottom section of the vertical shaft to be lowered to the ground thus becoming the load bearing support. A second pin is used to allow the upper portion of the vertical shaft to be raised to the desired height to lift, hang or load game or other objects onto the back of an ATV. A third pin is removed to allow the horizontal boom to rotate 360 degrees for loading the game or other objects onto the back of an ATV. A fourth pin when removed will allow the entire hoist to be disassembled and removed from the ATV. When the hoist is in a closed position the present invention can further be used to carry a hunter's tree climber stand or gun case.

Accordingly, it is the principal object of the present invention to provide a load-bearing, 360 degree rotating hoist for lifting and loading game or other objects onto the back of an ATV.

It is a further object of the present invention to provide a rack for carrying a hunter's tree climber stand or gun case.

Still another object of the present invention is to provide a hoist for hanging or lifting carcasses in the field.

Still another object of the present invention is to provide a hoist for hanging, lifting or loading game that can be varied in height.

Still another object of the present invention is to provide a load-bearing hoist for hanging or lifting and loading game that is attached to an ATV when in use.

Still another object of the present invention is to use the winch rope for towing.

Still another object of the present invention is that hoist can be easily mounted or removed from the ATV.

Yet another object of the present invention is to provide a two-piece telescoping shaft that solely supports the weight of the game and/or other objects being lifted. Thus, no weight load on the ATV. It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

List of Reference Numerals:

10 hoist
11 rotating horizontal boom
12 upper portion of shaft
13 fixed support sleeve
14 lower portion of shaft -continued List of Reference Numerals:

15 fixed shaft section
16 vertical shaft base
18 bracket
20 winch
21 spool
22 nylon rope
24 crank
26 hook
28 telescoping vertical shaft
30 cargo rack
31 base plate
32 quick release pin
34 quick release pin
36 quick release pin
38 quick release pin
40 round pipe cap
42 standard nut
44 standard bolt
46 conventional thrust bearing
48 standard washer
50 all terrain vehicle (ATV)
52 hole

DETAILED DESCRIPTION OF THE PREFERRED EMBODIMENTS

Referring to FIGS. 1–7, the present invention is directed to a load-bearing hoist 10 for lifting and loading game animals or other objects onto the back of an ATV 50. The hoist 10 has a two-piece telescoping vertical shaft 28 with an upper portion 12 that telescopes within a lower portion 14 thus allowing the height of the hoist 10 to be varied. A 360 degree rotating horizontal boom 11 is fixed to the top of the upper portion 12 of the two-piece telescoping vertical shaft 28.

A manually operated winch 20 is attached to the 360 degree rotating horizontal boom 11. A pin 36 inserted into the horizontal boom 11 when removed allows the horizontal boom 11 to rotate 360 degrees. The winch 20 is of standard type with a spool rotated by a hand crank 24. A supply of nylon rope 22 is wound around the spool 21 of the winch 20. The winch 20 is attached to the horizontal boons 11 by a bracket 18. A standard type ratchet and pawl mechanism prevents the spool 21 from rotating uncontrollably. A power-operated winch may be used with the present invention if desired At the free end of the nylon rope a hook 26 is provided.

Figure 4:
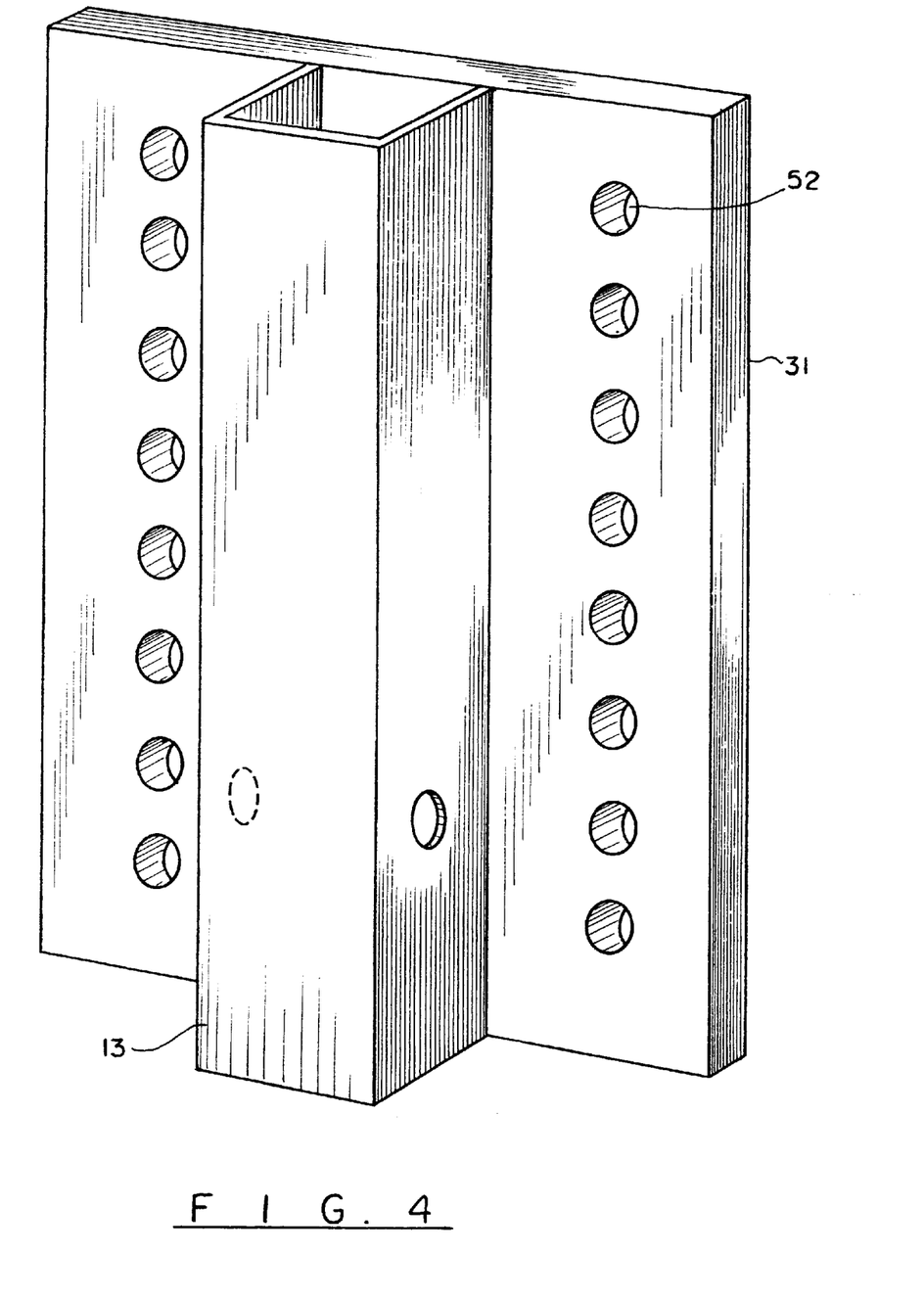
FIG. 4 is a perspective view of the support sleeve and base plate of the hoist of the present invention.
Figure 5:
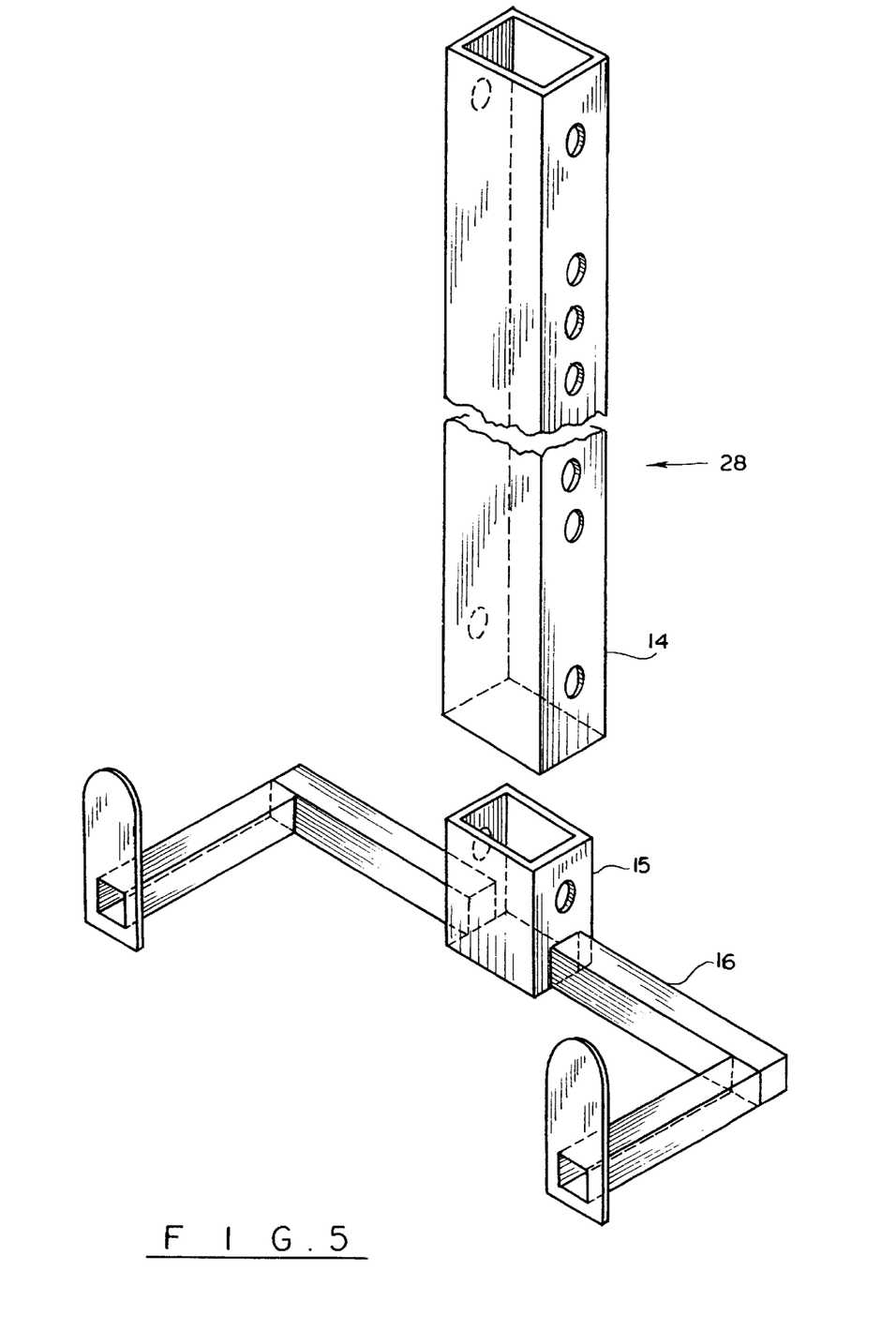
FIG. 5 is a fragmentary perspective view of the two-piece telescoping vertical shaft as it mounts to a base at the end of the shaft of the present invention.

The hoist is mounted to the cargo rack 30 of the back of an ATV 50 by a base plate 31 (FIG. 4). Attached to the base plate 31 is a fixed support sleeve 13 through which the two-piece telescoping vertical shaft 28 (FIG. 6) is inserted. The base plate 31 has bore holes FIG. 4, item 52 drilled therethrough to allow the base plate 31 to be bolted to the cargo rack of the ATV 50.

The width of the bore holes, FIG. 4, item 52, is chosen so that the ends of a U-bolt (not shown) can pass there through. By placing the u-bolts around the members of the frame of the cargo rack 30 and passing the u-bolt's threaded ends through the base plate 31, the base plate 31 can be secured to the cargo rack 30 by tightening down nuts that engage the threaded ends of the u-bolt. The u-bolts, being conventional fasteners, have not been shown in the illustrations.

Figure 1:
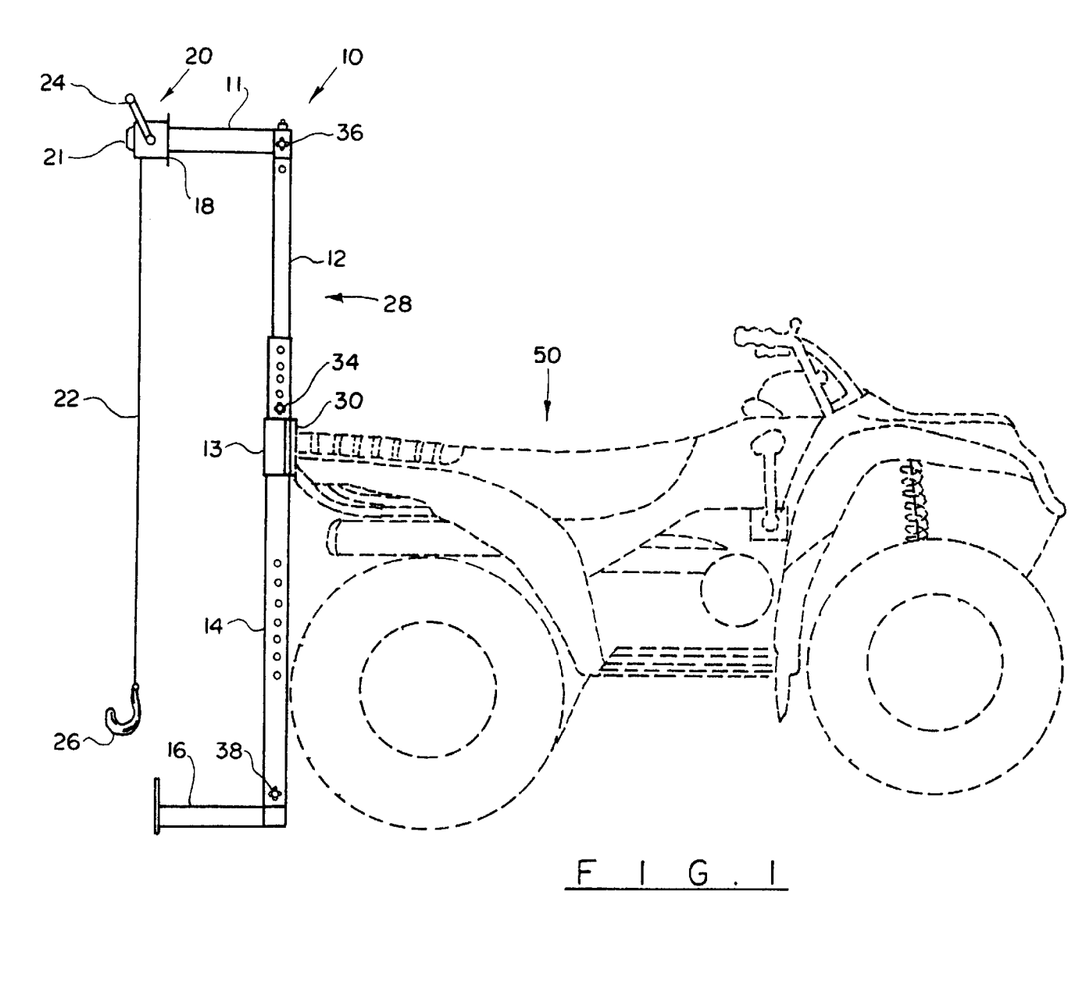
FIG. 1 is an side perspective view showing the hoist of the present invention attached to the back of an ATV in a working position.
Figure 2:
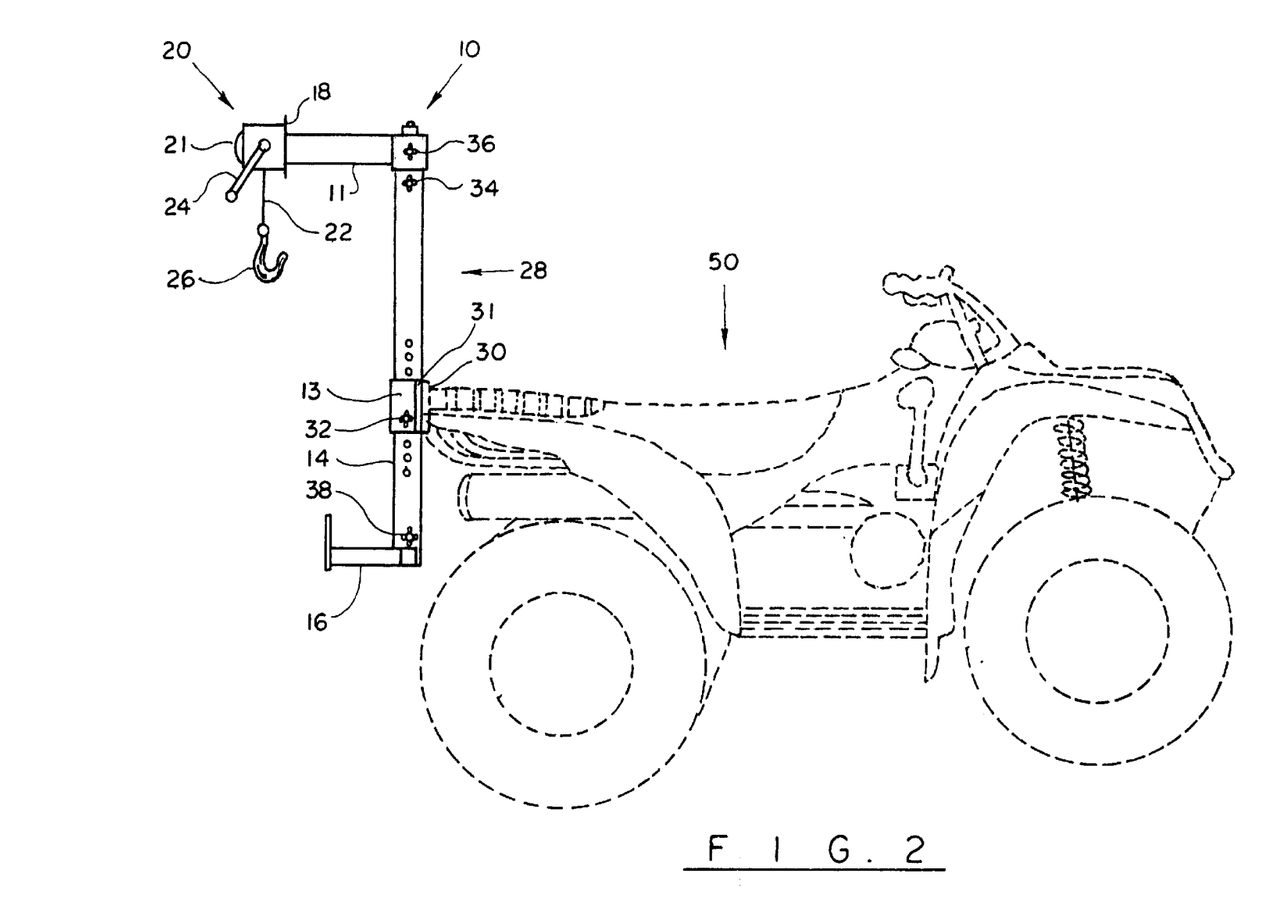
FIG. 2 is an side perspective view showing the hoist of the present invention attached to the back of an ATV in a traveling position.

In use, the hoist 10 is in the traveling state, shown in FIG. 2, while the ATV 50 is on route to and from the destination. Referring to FIG. 1, to place the hoist 10 in the traveling state (FIG. 2), the horizontal boom 10 is held fast by inserting a pin 36. A pin 34 is removed to allow the upper portion 12 to be inserted into the lower portion 14 as far as possible. The upper portion 12 is then secured in place by reinserting pin 34. The two-piece telescoping vertical shaft is then raised to the desired height and secured in place by inserting a pin 32 (FIG. 2) into the support sleeve 13. The pins are standard quick release pins.

Figure 7:
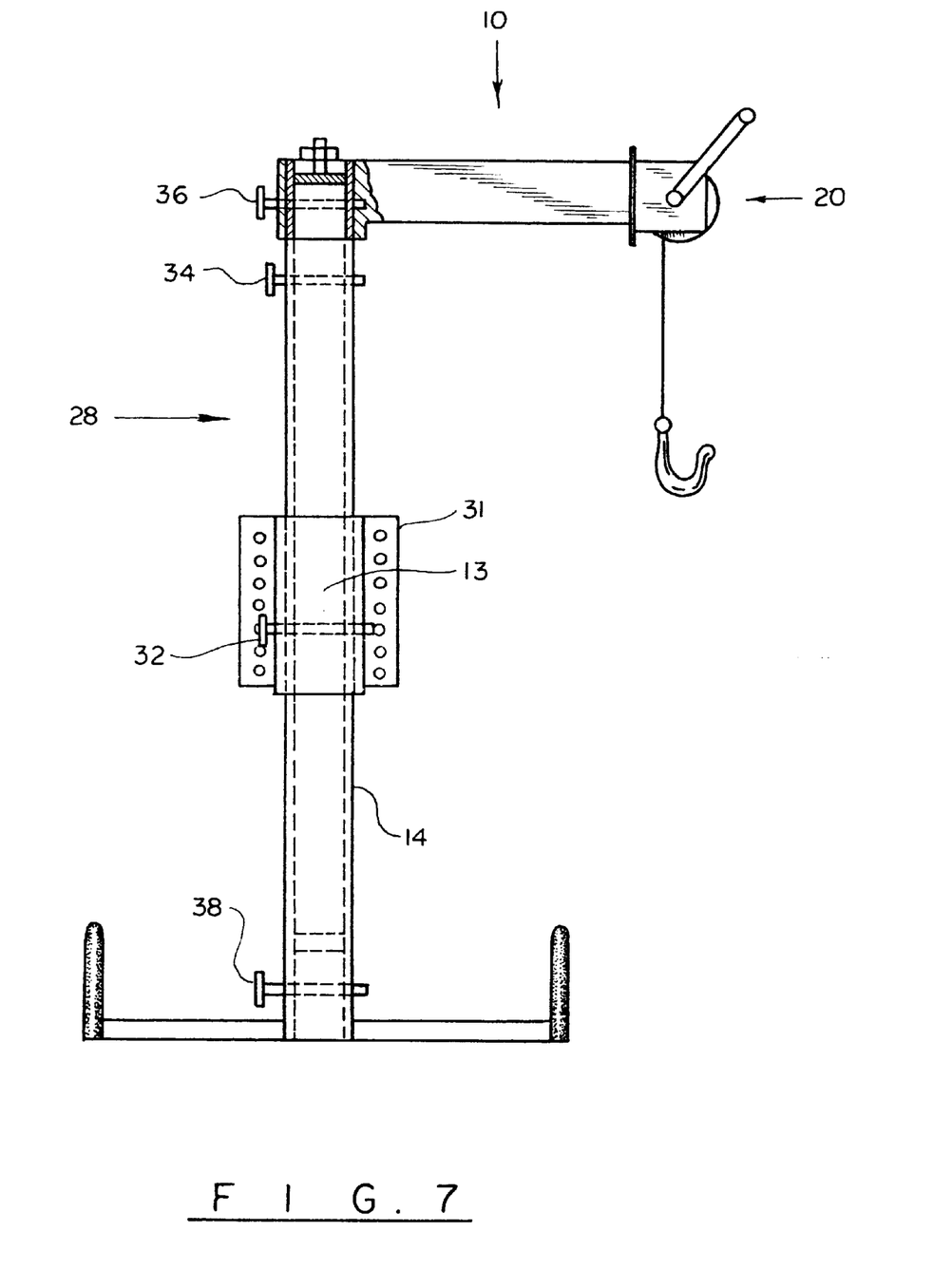
FIG. 7 is a end view of the hoist, winch, base plate and positioned pins of the present invention.
Figure 8:
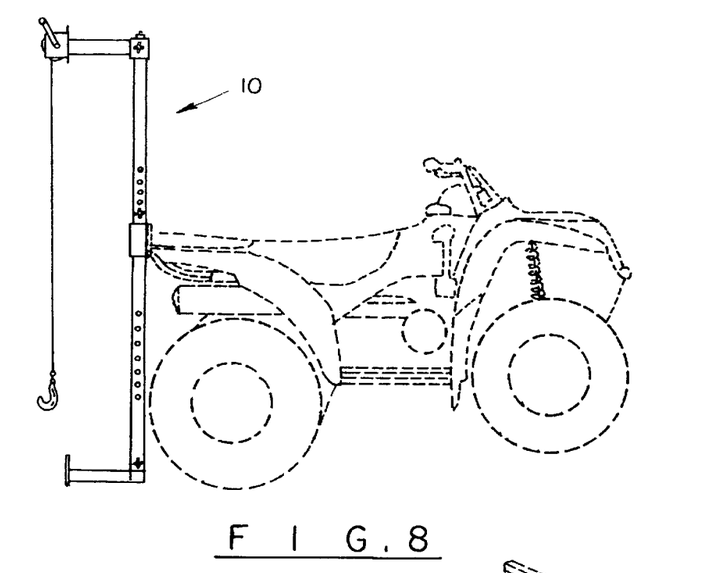
FIG. 8 is an side perspective view of the hoist of the present invention.
Figure 9:
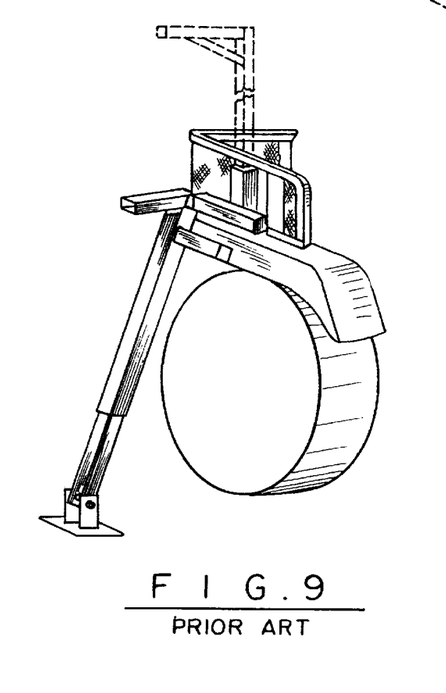
FIG. 9 is a detail and FIG. 10 is a perspective view of a prior art hoist with attachable bracing.
Figure 10:
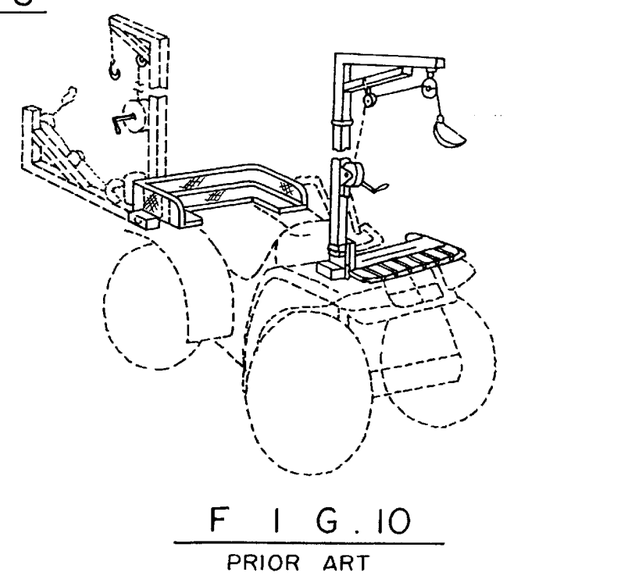

Further, while in the traveling state, shown in FIG. 2, the base of the telescoping vertical shaft 16 can be used as a rack for carrying a hunter's tree climber stand or gun case. The base, shown in FIG. 5, item 16, is attached to the two-piece telescoping vertical shaft 28 by inserting the fixed shaft section 15 of the base 16 into the lower portion 14 of the two-piece telescoping vertical shaft 28 and is then secured in place by a pin. FIG. 7, item 38.

Figure 6:
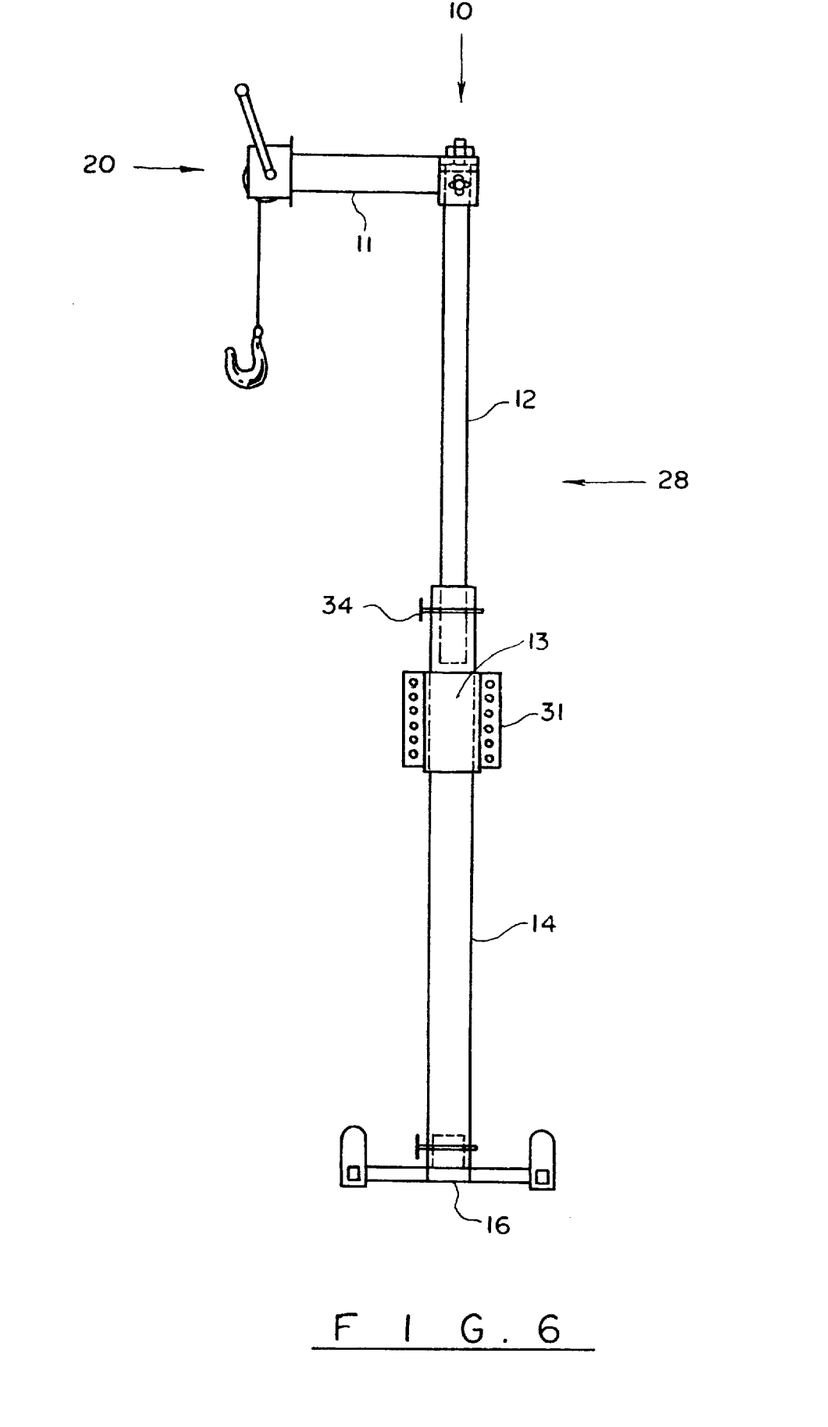
FIG. 6 is a end view of the hoist and base plate attachment of the present invention.

When the hoist 10 is to be used for lifting and loading objects, shown in FIG. 6, the pin 32 (FIG. 7) is removed to allow the two-piece telescoping vertical shaft 28 to be lowered to the ground thus becoming the load bearing support. The length of the two-piece telescoping vertical shaft 28 is then adjusted to the desired length. This is accomplished by removing a pin 34 (FIG. 7) and sliding the upper portion 12 (FIG. 6) out of the lower portion 14 until the desired length is reached. Pin 34, (FIG. 6) is reinserted into the two-piece telescoping vertical shaft 28.

Tripping the pawl of the winch 20 (FIG. 1) will allow the nylon rope 22 to be paid out so that the hook 26 can reach the object on the ground The hook 26 can be used to engage the eye of a gambrel that is itself hooked to the object. The winch 20 can now be cranked to lift the object. A pin 36 is removed to allow the horizontal boom 11 to rotate 360 degrees allowing game or other objects to be easily loaded onto the back of an ATV 50.

The horizontal and vertical sections 11, 12, 14 & 16 and the support sleeve 13 (FIG. 6) are all made from square hollow tubing. The dimensions of the central channel of the lower vertical shaft section 14 are large enough to accommodate the upper section 12 of the vertical shaft. The support sleeve 13 is large enough to accommodate the larger lower section 14 of the vertical shaft 28.

Figure 3:
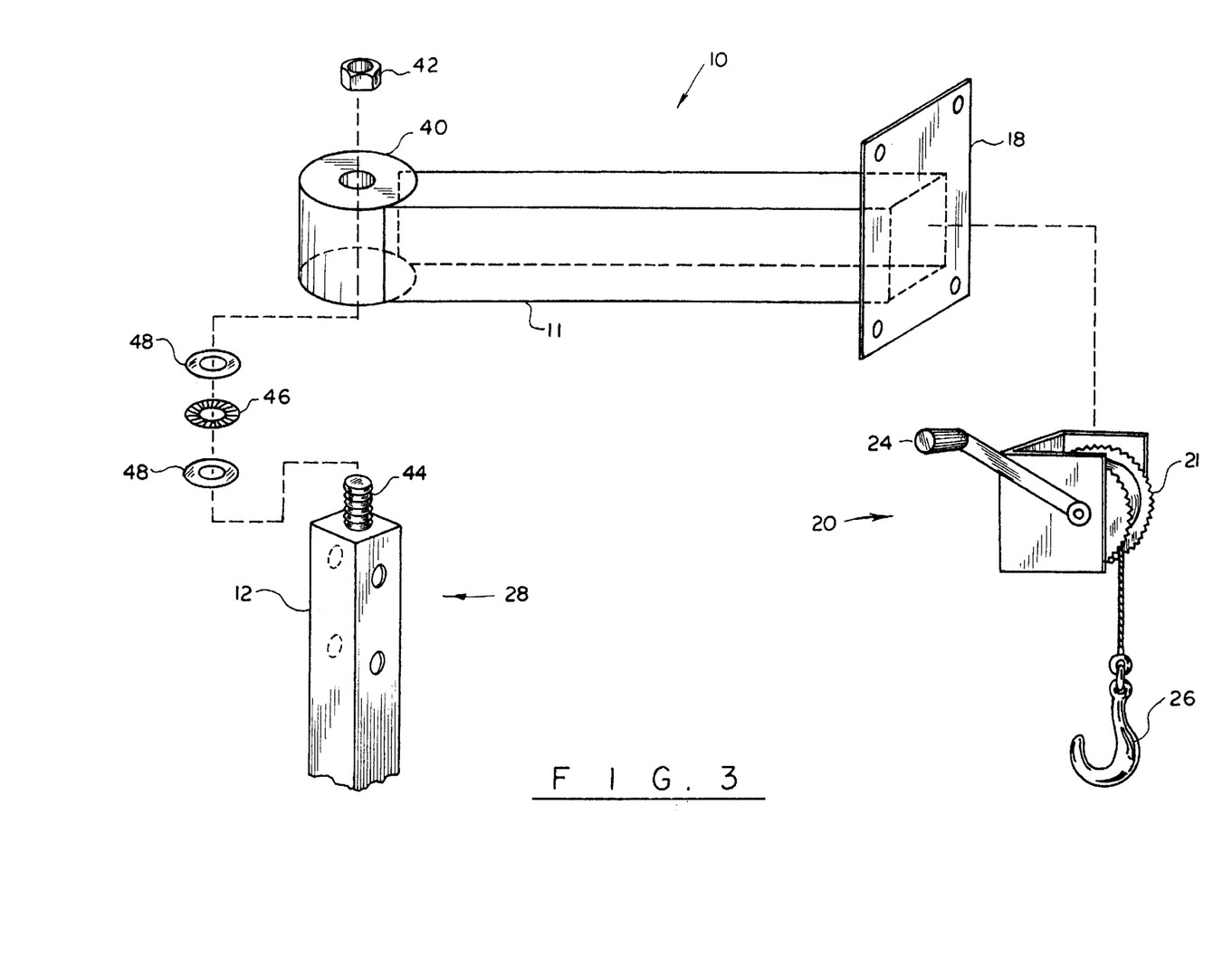
FIG. 3 is a fragmentary exploded view showing the horizontal 360 degree rotating boom and winch of the hoist of the present invention.

Referring to FIG. 3, the horizontal section 11 is attached to the vertical section 28 by a round pipe cap 40 and secured by a standard nut 42 and bolt 44 large enough to fit around the two-piece telescoping vertical shaft 28. The pipe contains a conventional thrust bearing item 46 and 2 washers 48 thus allowing the horizontal boom 11 to rotate 360 degrees.

One potential problem when lifting very heavy loads with a hoist 10 while it is attached to the ATV 50 is that the ATV may tip over due to the center of gravity of the ATV being shifted aft. To remedy this problem, shown in FIG. 6, the two-piece telescoping vertical shaft 28 is able to move freely within the support sleeve 13 thus becoming the sole load bearing support. No weight load is placed on the ATV.

To disassemble, a pin 38 (FIG. 7) is removed from the lower section 14 of the two-piece telescoping vertical shaft 28 allowing the base 16 (FIG. 5) to be removed from the two-piece telescoping vertical shaft 28. The two-piece telescoping vertical shaft 28 can then be lifted arid removed from the support sleeve 13. The hoist 10 can then be removed from the ATV 50.

It is to be understood that the present invention is not limited to the embodiments described above, but encompasses any and all embodiments within the scope of the following claims.

I claim:

1. A hoist attached to an ATV and used for lifting and loading animals onto the back of an ATV, the hoist comprising:

a two-piece telescoping vertical, load-bearing shaft having a first end, a second end, an upper section, a lower section, a bottom, a traveling position in which the lower section of the telescoping shaft is raised above the ground, and a working position in which the bottom of the shaft contacts the ground and the vertical shaft is a load bearing support for the hoist;

a horizontal boom having a first end and a second end, said horizontal boom having said first end attached for rotating to said first end of said vertical telescoping shaft;

a winch attached to said horizontal boom;

a rope wound around said winch;

a base plate attachable to the ATV, said base plate having a fixed vertical support sleeve which receives the upper and lower sections of the telescoping vertical shaft; and a base at the bottom of the telescoping vertical shaft which contacts the ground when the vertical shaft is in the working position, wherein in the traveling position the vertical shaft is fixed to the support sleeve and in the working position the vertical shaft can freely move within the support sleeve.

2. The hoist according to claim 1, wherein said horizontal boom rotates 360 degrees.

3. The hoist according to claim 1, wherein the base at the bottom of the telescoping vertical shaft is a rack sized to receive a gun case.

4. The hoist according to claim 1, wherein the base at the bottom of the telescoping vertical shaft is a rack sized to receive a hunter's tree climber stand.

5. The hoist according to claim 1, wherein the base plate is securely attached to the ATV, and the vertical shaft is secured to the support sleeve with two pins which, when removed, allow the vertical shaft to be removed from the support sleeve, leaving only the support sleeve and base plate attached to the ATV.

6. Apparatus including a hoist attachable to an ATV and used for lifting and loading objects onto the back of an ATV, the hoist comprising:

a two-piece telescoping vertical, load-bearing shaft having a first end, a second end, an upper section, a lower section, a bottom, a traveling position in which the lower section of the telescoping shaft is raised above the ground, and a working position in which the bottom of the shaft contacts the ground and the vertical shaft is a load bearing support for the hoist;

a horizontal boom having a first end and a second end, said horizontal boom having said first end attached for rotating to said first end of said vertical telescoping shaft;

a winch attached to said horizontal boom;

a rope wound around said winch;

a base plate attachable to the ATV, said base plate having a vertical support sleeve which receives the upper and lower sections of the telescoping vertical shaft; and a base at the bottom of the telescoping vertical shaft which contacts the ground when the vertical shaft is in the working position, wherein in the traveling position the vertical shaft is fixed to the support sleeve and in the working position the vertical shaft can freely move within the support sleeve.

7. The apparatus according to claim 6, wherein the vertical support sleeve of the base plate is a fixed vertical support sleeve.

8. The apparatus according to claim 6, wherein said horizontal boom rotates 360 degrees.

9. The apparatus according to claim 6, wherein the base at the bottom of the telescoping vertical shaft is a rack sized to receive a gun case.

10. The apparatus according to claim 6, wherein the base at the bottom of the telescoping vertical shaft is a rack sized to receive a hunter's tree climber stand.

11. The apparatus according to claim 6, wherein the base plate is securely attachable to the ATV, and the vertical shaft is secured to the support sleeve with two pins which, when the base plate is secured to the ATV and the pins are removed, allow the vertical shaft to be removed from the support sleeve, leaving only the support sleeve and base plate attached to the ATV.

12. The apparatus according to claim 6, further comprising an ATV attached to the hoist.

13. Apparatus including a hoist attachable to an ATV and used for lifting and loading objects onto the back of an ATV, the hoist comprising:

a vertical, load-bearing shaft having a first end, a second end, a bottom, a traveling position in which the shaft is raised above the ground, and a working position in which the bottom of the shaft contacts the ground and the vertical shaft is a load bearing support for the hoist;

a horizontal boom having a first end and a second end, said horizontal boom having said first end attached for rotating to said first end of said vertical shaft;

a winch attached to said horizontal boom;

a rope wound around said winch;

a base plate attachable to the ATV, said base plate having a vertical support sleeve which receives the vertical shaft; and a base at the bottom of the vertical shaft which contacts the ground when tile vertical shaft is in the working position, wherein in the traveling position the vertical shaft is fixed to the support sleeve and in the working position the vertical shalt can freely move within the support sleeve.

14. The apparatus according to claim 13, wherein the vertical support sleeve of the base plate is a fixed vertical support sleeve.

15. The apparatus according to claim 13, wherein said horizontal boom rotates 360 degrees.

16. The apparatus according to claim 13, wherein the base at the bottom of the vertical shaft is a rack sized to receive a gun case.

17. The apparatus according to claim 13, wherein the base at the bottom of the vertical shaft is a rack sized to receive a hunter's tree climber stand.

18. The apparatus according to claim 13, wherein the base plate is securely attachable to the ATV, and the vertical shaft is secured to the support sleeve with two pins which, when the base plate is secured to the ATV and the pins are removed, allow the vertical shaft to be removed from the support sleeve, leaving only the support sleeve and base plate attached to the ATV.

19. The apparatus according to claim 13, further comprising an ATV attached to the hoist.

20. The apparatus according to claim 13, wherein the said vertical shaft is telescoping.

* * * * *